United States Patent
Wen et al.

(10) Patent No.: US 7,409,348 B2
(45) Date of Patent: Aug. 5, 2008

(54) LANGUAGE LISTENING AND SPEAKING TRAINING SYSTEM AND METHOD WITH RANDOM TEST, APPROPRIATE SHADOWING AND INSTANT PARAPHRASE FUNCTIONS

(75) Inventors: Say Ling Wen, Taipei (TW); Zechary Chang, Taipei (TW); Pinky Ma, Beijing (CN)

(73) Assignee: Inventec Corporation, Taipei (TW)

( * ) Notice: Subject to any disclaimer, the term of this patent is extended or adjusted under 35 U.S.C. 154(b) by 1011 days.

(21) Appl. No.: 10/202,010

(22) Filed: Jul. 25, 2002

(65) Prior Publication Data

US 2004/0019486 A1 Jan. 29, 2004

(51) Int. Cl.
*G10L 21/00* (2006.01)
(52) U.S. Cl. .............................. 704/270; 704/3; 704/9; 434/157
(58) Field of Classification Search ................. 704/270, 704/1–10, 270.1, 277, 201, 257; 434/157, 434/169, 156; 707/530, 532; 715/530
See application file for complete search history.

(56) References Cited

U.S. PATENT DOCUMENTS

| | | | | |
|---|---|---|---|---|
| 5,393,236 A | * | 2/1995 | Blackmer et al. | 434/169 |
| 5,882,202 A | * | 3/1999 | Sameth et al. | 434/157 |
| 6,154,757 A | * | 11/2000 | Krause et al. | 715/530 |
| 6,305,942 B1 | * | 10/2001 | Block et al. | 434/156 |
| 6,523,007 B2 | * | 2/2003 | Layng et al. | 704/270 |

* cited by examiner

*Primary Examiner*—Huyen X. Vo
(74) *Attorney, Agent, or Firm*—Jacobson Holman PLLC

(57) ABSTRACT

A language listening and speaking teaching system and method that utilize a random tests function to provide full-scale and various language training subjects and enable a learner to set up the listening and speaking training process according to his/her preference and create a more well-chosen shadowing learning process. Moreover, it assists a learner by enhancing and deepening the listening and speaking training content through an instant paraphrase and definition function, following completion of the shadowing learning process.

8 Claims, 4 Drawing Sheets

LANGUAGE LISTENING AND SPEAKING TRAINING SYSTEM AND METHOD WITH RANDOM TEST, APPROPRIATE SHADOWING AND INSTANT PARAPHRASE FUNCTIONS

FIELD OF THE INVENTION

The invention relates to a computer-assisted language learning system, and particularly a language listening and speaking training system and method with the features of random tests, well-chosen shadowing (vocal imitation) and instant paraphrase and definition that enables a learner to develop abilities in vocal imitation.

BACKGROUND OF THE INVENTION

With the coming of the age of globalization, there are more and more opportunities for people throughout the world to communicate. Therefore, an increasing number of people are eager to learn foreign languages. It is very important for people to catch on to what others say as well as to be understood by others during conversations in a foreign language. Hence, it is crucial to enhance a learner's listening and speaking abilities with present foreign language teaching systems.

With the listening skill, a learner focuses on listening comprehension, i.e. clearly listening to others and negotiating meaning. Therefore, language training on listening comprehension requires one to find as much opportunity as possible to in listen to people talking in a foreign language, so that one is able to become familiar with tones, speeds and intonation of the foreign language. Consequently, one is capable of enhancing his/her language "listening" ability through clearly appreciating people talking in a foreign language.

With the speaking skill, a learner focuses on pronunciation of a foreign language by way of constant vocal imitation practices that enable one to speak accurately and correctly and to be understood. Similarly, to develop speaking ability, one repeatedly imitates and practices tones, speeds and intonation of the foreign language.

Excepting for basic listening and speaking learning skills of a foreign language, it is important that we do not limit ourselves to some sorts of subjects or aspects in learning a foreign language, as this does not prepare learners to utilize the language in real-life situations. Therefore, we have to learn a foreign language with full-scale subjects. Only through repeatedly training in all kinds of subjects can learners practically master a foreign language. This enables us to deepen our learning, have advanced comprehension of the content, and master a foreign language through repeatedly listening to and speaking the language.

Conventional language training on listening and speaking hardly enables learners to have actual opportunities to keep in practice, excepting for one-to-one teaching with a teacher and a learner. However, even on one-to-one teaching, a learner spends too much time with constant and repetitive practices. This is ineffective and may make a learner fear being embarrassed, which reduces the teaching effect. Therefore, language listening and speaking teaching via computer technology has become a trend in learning a foreign language, and there are many similar learning products on the market. However, those learning products generally achieve the training objectives of listening and speaking by established spoon-feed training ways, i.e., providing given tests in sequence through several simple word prompts in combination with monotone sound. Such tedious learning methods reduce a learner's willingness to learn, and limit the learning subjects, which further frustrates a learner.

SUMMARY OF THE INVENTION

The invention aims at resolving the preceding disadvantages by providing a language listening and speaking training system and method with the functions of random tests, well-chosen shadowing (vocal imitation) and instant paraphrase and definition. The goals of the disclosed system and its method are to:

(1) Enable a learner to explore a variety of subjects in a short time through its random test function and to develop a learner's abilities in a variety of ways.

(2) Enable a learner to set up various parametric configurations according to his/her learning preference through a parameter setup. This makes the shadowing learning process more appropriate to the needs of a learner and further enhances the willingness of the learner.

(3) Enable a learner to fully understand, deepen and master listening and speaking training content through the instant paraphrase and definition function.

To achieve the above-mentioned objects, the disclosed invention of a language listening and speaking training system and method consists of: a textbook database, a random test module, a shadowing learning module and a parameter setup module.

Furthermore, the disclosed invention of a language listening and speaking training system and method consists of the following steps: starting up the language listening and speaking training system, entering a teaching journey, executing parameter initialized tasks, generating a sample of teaching data through a test retrieving procedure, outputting the sample of teaching data for a learner to do shadowing learning, displaying word definitions to the learner when s/he completes the shadowing learning process to complete the learner's language listening and speaking training.

The feasibility and practicality of the invention will be elaborated by means of an embodiment depicted in the following.

DESCRIPTION OF THE PREFERRED EMBODIMENT

This invention is a language listening and speaking training system and method with random tests, well-chosen shadowing (vocal imitation) and instant paraphrase and definition. The disclosed invention utilizes its random test function by providing full-scale and various training subjects for a learner to develop his/her listening and speaking abilities. It enables a learner to set up the listening and speaking training system 200 according to his/her preference to acquire a more well-chosen shadowing learning process. It enables the learner to gain listening and speaking skills in a foreign language under the most suitable circumstance according to the learner's learning habits. Moreover, it assists a learner by enhancing and deepening the listening and speaking training content following completion of the shadowing learning process through the instant paraphrase and definition function.

Figure 1:
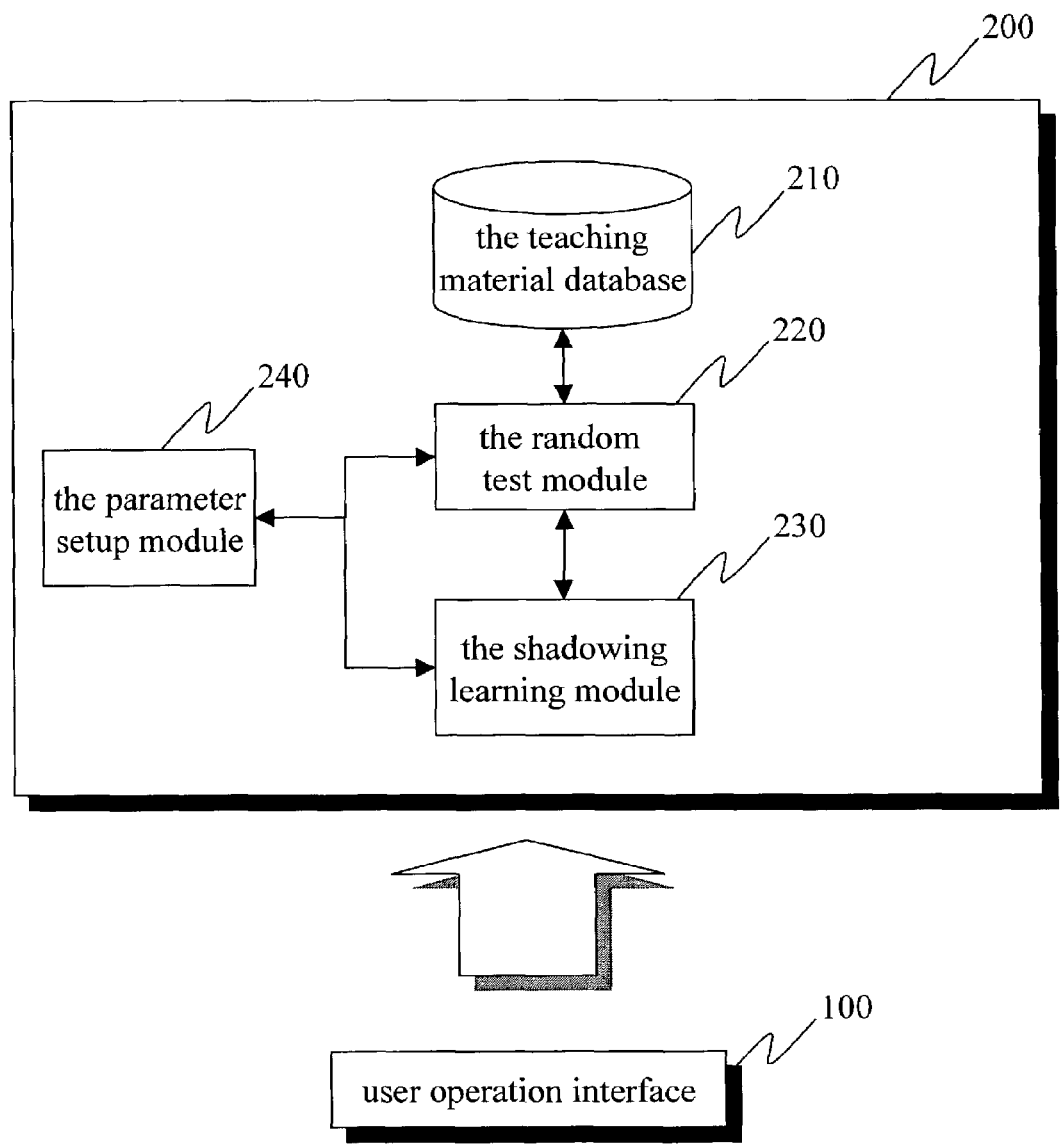
FIG. 1 is a block diagram of functional modules according to the disclosed language listening and speaking training system and method.

FIG. 1 is a block diagram of functional modules according to the disclosed language listening and speaking training system and method with random tests, well-chosen shadowing (vocal imitation) and instant paraphrase and definition. It is described in detail as follows:

(1) A teaching material database 210 stores teaching material samples for processing shadowing learning. Each teaching material sample includes a teaching material number, a teaching material category number, a standard vocal demonstration, a cue message for the teaching material sample, and a translation message. The cue message for the teaching material sample and the translation message, which can be combined with various media, such as lettering, speech sounds, pictures and animations, enable a learner to better understand learning content during the language listening and speaking training.

(2) A random test module 220 retrieves a corresponding teaching material sample for processing shadowing learning from the teaching material database 210 through a specific test retrieving procedure. The test retrieving procedure is to determine a teaching material number and a teaching material category number based on the random test method set up by a parameter setup module 240 and through a random variable generator (generating a random variable from a stored random variable array according to a built-in random variable list).

(3) A shadowing learning module 230 outputs a teaching material sample based on pre-set data by a parameter setup module 240 after the teaching material sample is determined by the system. It then processes shadowing learning (including recording a learner's vocal imitation and playing both a standard vocal demonstration and the learner's vocal imitation) and provides an explanatory message for the learner after the learning process is completed.

(4) A parameter setup module 240 sets up related parameters, such as random test types (e.g. test ranges, test difficulties, etc.), play types (e.g. play speed, play times, etc.) and message delivery types (e.g. message types, message display time, etc.).

Figure 2:
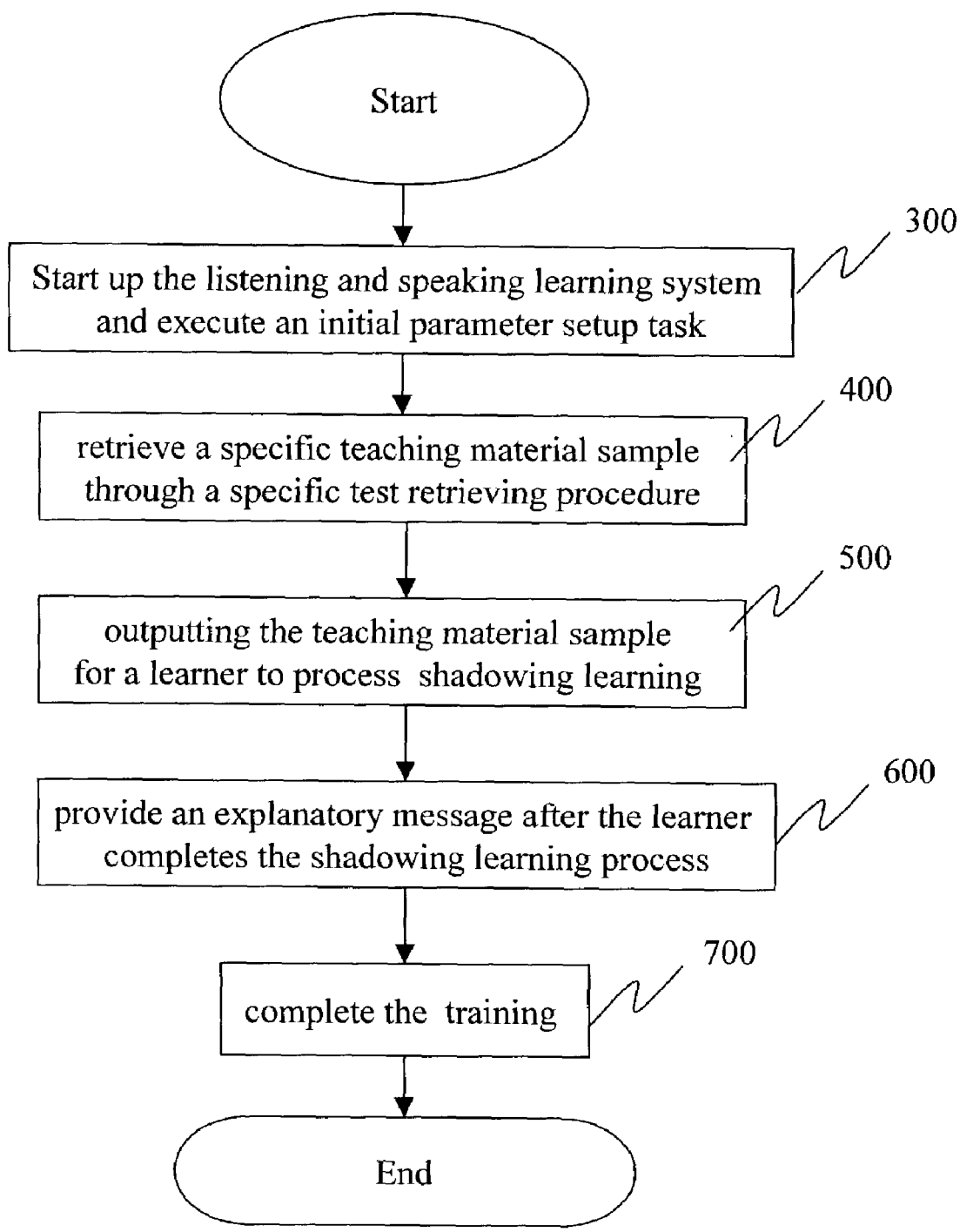
FIG. 2 is an operational flowchart of the disclosed system and method.

In addition, FIG. 2 illustrates the operational flowchart of the disclosed system and method. The details are described as follows.

First, a learner has to start up the listening and speaking learning system 200. The system then automatically executes initial parameter setup (step 300). All parameters (including random test parameters, displaying parameters, message display parameters, etc.) are pre-set by the learner through a user operation interface 100 before proceeding with the language training. It mainly processes the initial tasks of the respective modules. When the learner starts the listening and speaking training, the system retrieves a specific teaching material sample from the aforementioned teaching material database 210 (step 400) through a specific test retrieving procedure based on pre-set data of random test parameters from the random test module 220. The specific test retrieving procedure involves generating a random variable from a stored a random variable array according to a built-in random variable list. The system then output the teaching material sample for the learner to begin the shadowing learning process, which includes the steps of recording a learner's vocal imitation and playing both the standard vocal demonstration and the learner's vocal imitation (step 500). The system then provides an explanatory message for the learner (step 600) after s/he completes the shadowing learning process by the teaching material sample. Therefore, it completes the process flow for a learner's language listening and speaking learning (step 700).

Figure 3:
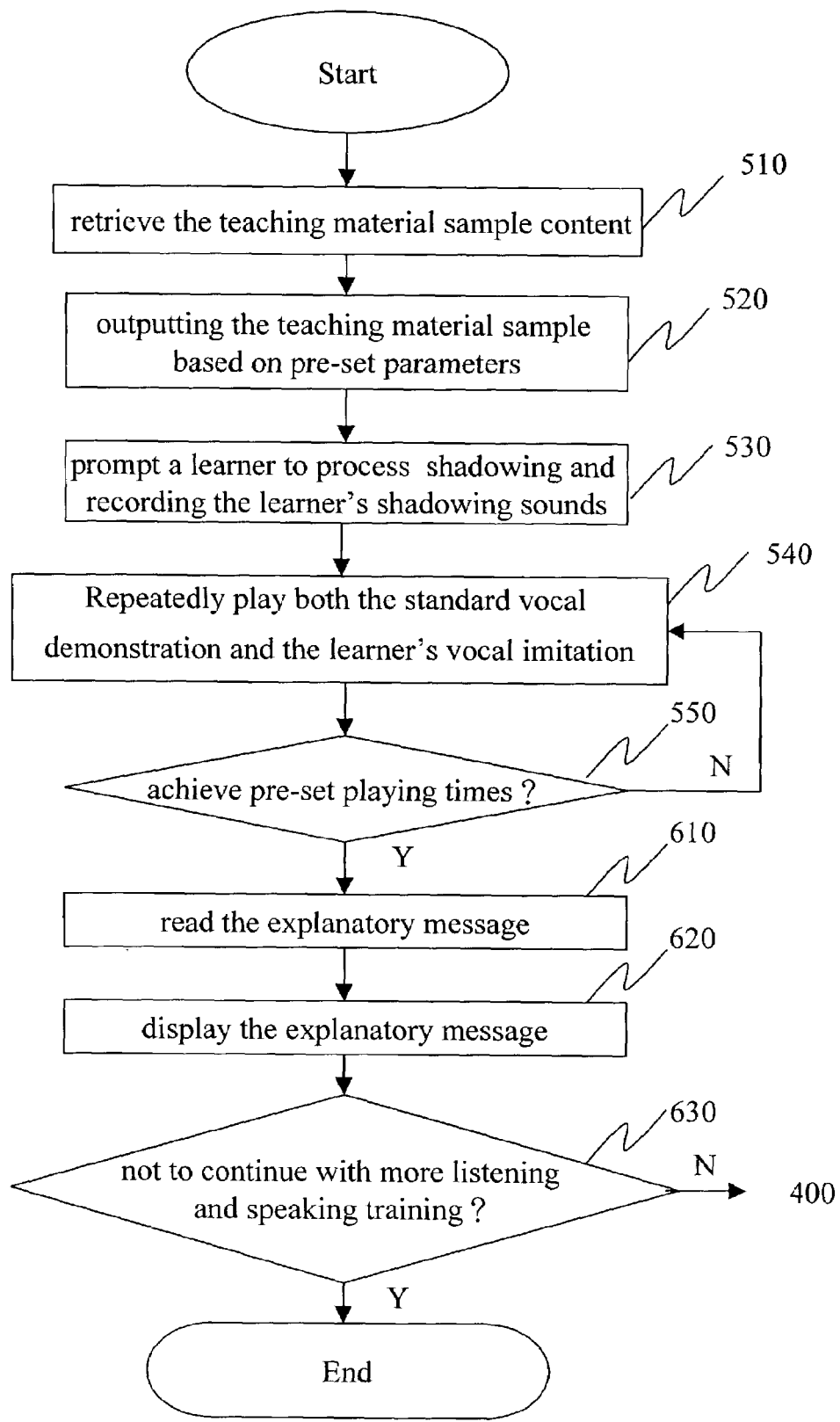
FIG. 3 is a flowchart of the disclosed system and method.

FIG. 3 shows a learner to processing shadowing learning, which is described as follows.

First, the shadowing learning module 230 retrieves a teaching material sample for a shadowing learning process (step 510), and then plays a standard vocal demonstration of the teaching material sample based on pre-set data (step 520). The learner starts to shadow (imitate) the standard demonstration, and the system records the learner's phonic shadowing (vocal imitation) (step 530). After recording process is completed, the system repeatedly plays both the standard vocal demonstration and the learner's vocal imitation, according to pre-set parameters (step 540). The system automatically verifies if play times match the times pre-set by the learner after each playing (step 550). If NO, the flow goes back to step 540 to re-play once. If YES, the system completes the shadowing learning process, reads an explanatory message of the teaching material sample (step 610), and displays the explanatory message of the teaching material sample (step 620) to enable the learner to have a better understanding of the shadowing learning content. The learner can determine whether to continue another learning process through the user operation interface (step 630) after s/he completes one learning process. If YES, the flow goes back to step 400 to generate another test; otherwise, it stops the flow.

Figure 4:
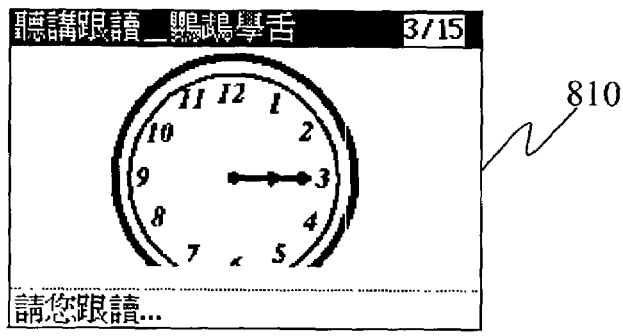
FIG. 4 is a practical example of the disclosed system and method.
Figure 4:
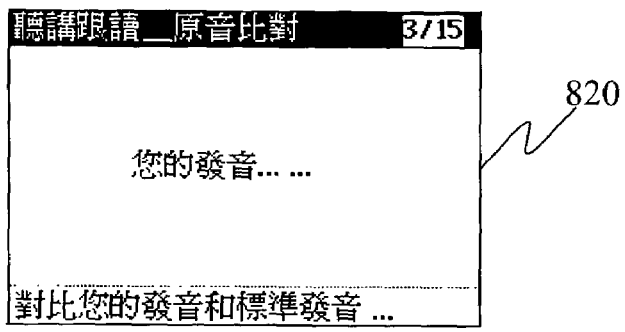
Figure 4:
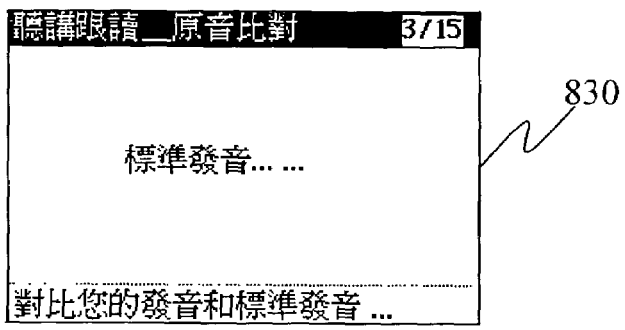
Figure 4:
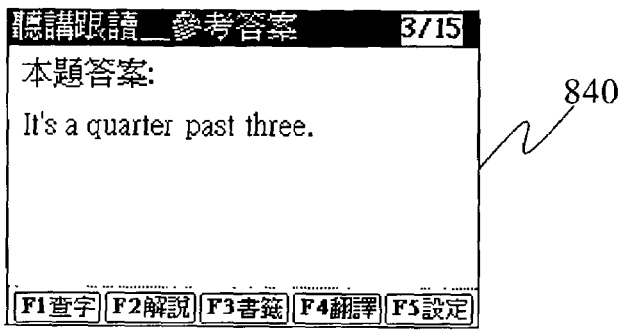

The feasibility and practicality of the invention will be elaborated by means of an embodiment depicted in the following. FIG. 4 practically describes an example of the disclosed system and method.

First, on the display 810 a standard vocal demonstration of the system is played and the vocal shadowing of the learner is recorded. The system plays the standard vocal demonstration of the teaching material sample for the learner, prompts the learner to process shadowing and at the same time, and initiates the recording function to record speech sounds of the learner. Following the display 810, the system goes to the re-playing stage. The learner's recorded shadowing sounds are played on the display 820. The system then goes to the display 830 for playing the standard vocal demonstration for the learner. This re-playing stage repeatedly plays both the standard vocal demonstration and the learner's recorded shadowing sounds based on pre-set playing times. Its main purpose is to thoroughly enable a learner to know and contrast phonic characteristics and correct his/her own pronunciation. On the display 840, when the system completes the shadowing learning process, it shows the explanatory message of the teaching material sample to the learner. This enables the learner to have a better understanding of the shadowing learning content. An invention in the form of a computer-assisted language listening and speaking teaching system and method is disclosed herein. These and other variations, which will be understood by those skilled in the art, are within the intended scope of the invention as claimed below. As previously stated, detailed embodiments of the invention are disclosed herein; however, it is to be understood that the disclosed embodiments are merely exemplary of the invention that may be embodied in various forms.

What is claimed is:

1. A language listening and speaking training system with features of random tests, well-chosen shadowing (vocal imitation) and instant paraphrase and definition, the system comprising:

a teaching material database to store at least one teaching material sample, the teaching material sample including a teaching material number, a teaching material category number, a standard vocal demonstration, a cue(prompting) message, and an explanatory message (translation), and the cue(prompting) message and the explanatory message (translation) including lettering, speech sounds, pictures and animations;

a random test module to retrieve a teaching material sample for proceeding shadowing learning from the teaching material database through a specific test retrieving procedure, the specific test retrieving procedure is being through a random variable generator to generate a random variable from a stored random variable array according to a built-in random variable list;

a parameter setup module to enable a learner to proceed with a parameter setup before a language listening and speaking training, the parameter setup including setup of a random test parameter having test ranges and test difficulties, a play parameter having play speed and play times, and a message delivery parameter having message types and messages display times; and a shadowing learning module to output the teaching material sample based on pre-set data by the parameter setup module for the learner to process shadowing learning by recording the learner's shadowing sounds and repeatedly playing both standard vocal demonstration and learner's vocal imitation, and provide an explanatory message to the learner after the shadowing learning process is completed.

2. The system as recited in claim 1, wherein the shadowing learning module includes a displaying unit, a recording unit and a playing unit.

3. A language listening and speaking training method with features of random tests, well-chosen shadowing (vocal imitation) and instant paraphrase and definition, the method comprising the following steps:

executing an initial parameter setup task by enabling a learner to proceed with a parameter setup before a language listening and speaking training, the parameter setup including setup of a random test parameter having test ranges and test difficulties, a play parameter having play speed and play times, and a message delivery parameter having message types and messages display times;

retrieving a specific teaching material sample from a teaching material database through a specific test retrieving procedure, the specific test retrieving procedure being through a random variable generator to generate a random variable from a stored random variable array according to a built-in random variable list;

outputting the teaching material sample based on pre-set data by the parameter setup task for the learner to process shadowing learning by recording the learner's shadowing sounds and repeatedly playing both standard vocal demonstration and learner's vocal imitation, and provide an explanatory message to the learner after the shadowing learning process is completed; and completing the training;

the teaching material database storing at least one teaching material sample, the teaching material sample including a teaching material number, a teaching material category number, a standard vocal demonstration, a cue(prompting) message, and an explanatory message (translation), and the cue(prompting) message and the explanatory message (translation) including lettering, speech sounds, pictures and animations.

4. The method as recited in claim 3, further comprising generating a random test and setting up a parameter for a shadowing learning process to a learner.

5. The method as recited in claim 3, wherein the parameter setup includes a setup of a random test parameter, a play parameter and a message delivery parameter.

6. The method as recited in claim 3, wherein the teaching material sample includes a teaching material number, a teaching material category number, a standard vocal demonstration, a cue(prompting) message, and an explanatory message (translation).

7. The method as recited in claim 6, wherein the cue (prompting) message and the explanatory message(translation) include lettering, speech sounds, pictures and animations.

8. The method as recited in claim 3, further comprising proceeding with listening and speaking training by instantly providing the explanatory message(translation) after outputting the teaching material sample.

* * * * *